(12) United States Patent
Sack et al.

(10) Patent No.: US 6,520,465 B1
(45) Date of Patent: Feb. 18, 2003

(54) ROTATION AND TRANSLATION BRACKET

(75) Inventors: James A. Sack, Elverson; Arthur L. Gehr, Jr., East Earl; Glenn E. Gehr, New Holland, all of PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 09/736,409

(22) Filed: Dec. 15, 2000

Related U.S. Application Data

(60) Provisional application No. 60/171,118, filed on Dec. 16, 1999.

(51) Int. Cl.[7] .............................................. A47B 96/00
(52) U.S. Cl. .............................. 248/227.4; 248/231.61; 248/296.1; 403/84
(58) Field of Search .............................. 403/84, 83, 85, 403/99, 100, 112, 113, 373, 399; 248/286.1, 285.1, 296.1, 227.4, 229.14, 229.24, 228.5, 230.5, 231.61

(56) References Cited

U.S. PATENT DOCUMENTS

| | | | |
|---|---|---|---|
| 169,383 A | 11/1875 | Starr | |
| 259,957 A | 6/1882 | White | |
| 313,781 A | 3/1885 | Starr et al. | |
| 333,019 A | 12/1885 | Merrick | |
| 398,893 A | 3/1889 | Gould | |
| 438,238 A | 10/1890 | Jefferies et al. | |
| 461,928 A | 10/1891 | White | |
| 546,631 A | 9/1895 | White | |
| 1,438,534 A | * 12/1922 | Kuen | |
| 1,885,507 A | 11/1932 | Browne | |
| 2,630,342 A | 3/1953 | Gilmont | 287/54 |
| 2,652,221 A | 9/1953 | Kampa | 248/278 |
| 3,043,587 A | * 7/1962 | Underhill | |
| 3,098,128 A | 7/1963 | Audin | 179/146 |
| 3,188,079 A | 6/1965 | Boetcker et al. | 269/328 |
| 3,269,683 A | * 8/1966 | Shinaver | |
| 3,497,259 A | 2/1970 | Sherfey | 297/391 |
| 3,730,589 A | 5/1973 | Lane | 297/391 |
| 3,761,126 A | 9/1973 | Mulholland | 297/384 |
| 3,850,398 A | * 11/1974 | Kantor | |
| 4,273,116 A | 6/1981 | Chiquet | 128/92 A |
| 4,617,919 A | 10/1986 | Suhre | 128/78 |
| 4,732,423 A | 3/1988 | Condon | 297/284 |
| 4,964,603 A | * 10/1990 | Yair | |
| 5,039,048 A | * 8/1991 | Paxton | |
| 5,090,073 A | 2/1992 | Nordan et al. | 5/640 |
| 5,310,155 A | * 5/1994 | Wu | |
| 5,332,287 A | 7/1994 | Whitmyer | 297/405 |
| 5,393,161 A | 2/1995 | Mata et al. | 403/133 |
| 5,626,320 A | 5/1997 | Burrell et al. | 248/230.6 |
| 5,803,642 A | 9/1998 | Sassmannshausen | 403/90 |

* cited by examiner

*Primary Examiner*—Korie Chan
(74) *Attorney, Agent, or Firm*—Hogan & Hartson LLP

(57) ABSTRACT

A rotation and translation bracket providing pivotal and linear adjustment. The bracket includes a base, a rotation lock and pivotal member, and a translation lock and linear tube. Linear adjustment is allowed by tightening or loosening the translation lock. In a locked position the tube is fixed between locking surfaces of the base and translation lock. Inclined surfaces on the base and translation lock slide against each other providing an increasing binding force to be exerted on the tube as the translation lock is tightened. When tightened, the base, translation lock, and tube remain in a substantially fixed position. Pivotal adjustment is allowed by tightening or loosening the rotation lock. In a locked position the pivotal member is fixed between locking surfaces of the base and rotation lock. Inclined surfaces on the base and rotation lock slide against the inner surface of the pivotal member providing an increasing binding force to be exerted on the pivotal member as the rotation lock is tightened. When tightened, the base, rotation lock, and tube remain in a substantially fixed position.

13 Claims, 16 Drawing Sheets

ROTATION AND TRANSLATION BRACKET

CROSS-REFERENCE TO RELATED APPLICATIONS

This application claims the benefit of Provisional Patent Application No. 60/171,118, filed Dec. 16, 1999, and entitled "Rotation and Translation Bracket."

BACKGROUND OF THE INVENTION

1. Field of the Invention

The present invention relates to a rotation and translation bracket, and more particularly to a bracket for allowing pivotal and linear adjustment of two or more members.

2. Discussion of the Related Art

A number of conventional pivotal and linear adjustment devices are known in the prior art. These designs generally suffer from problems and deficiencies relating to operability and reliability. Also, such conventional adjustment devices are often expensive and difficult to manufacture and assemble.

SUMMARY OF THE INVENTION

Accordingly, the present invention is directed to an improved structure for a bracket assembly that provides pivotal and linear adjustment. The bracket assembly includes a linear member disposed within the base and a translation lock and a pivotal member disposed within a base and a rotation lock. Until secured, the base and translation lock are adapted to linearly slide with respect to the linear member. Once the desired linear adjustment is achieved, the translation lock and base are secured, engaging with the linear member. In this position, the base, translation lock and linear member remain in a substantially fixed relationship with respect to one another.

The base and rotation lock allow the pivotal member to rotate, until secured. Once the desired rotational adjustment is achieved, the rotation lock and base are secured, engaging with the pivotal member. In this position, the base, rotation lock and pivotal member remain in a substantially fixed relationship with respect to one another.

One of the features of the present invention is that the rotation and translation locks provide simple adjustment. By loosening the rotation or translation locks the pivotal member and/or linear member are disengaged allowing for free movement.

Another feature of the present invention is the force generated by the locks increasing the brackets ability to remain in a fixed position.

Still another feature of the present invention is the ease and low cost of manufacture.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
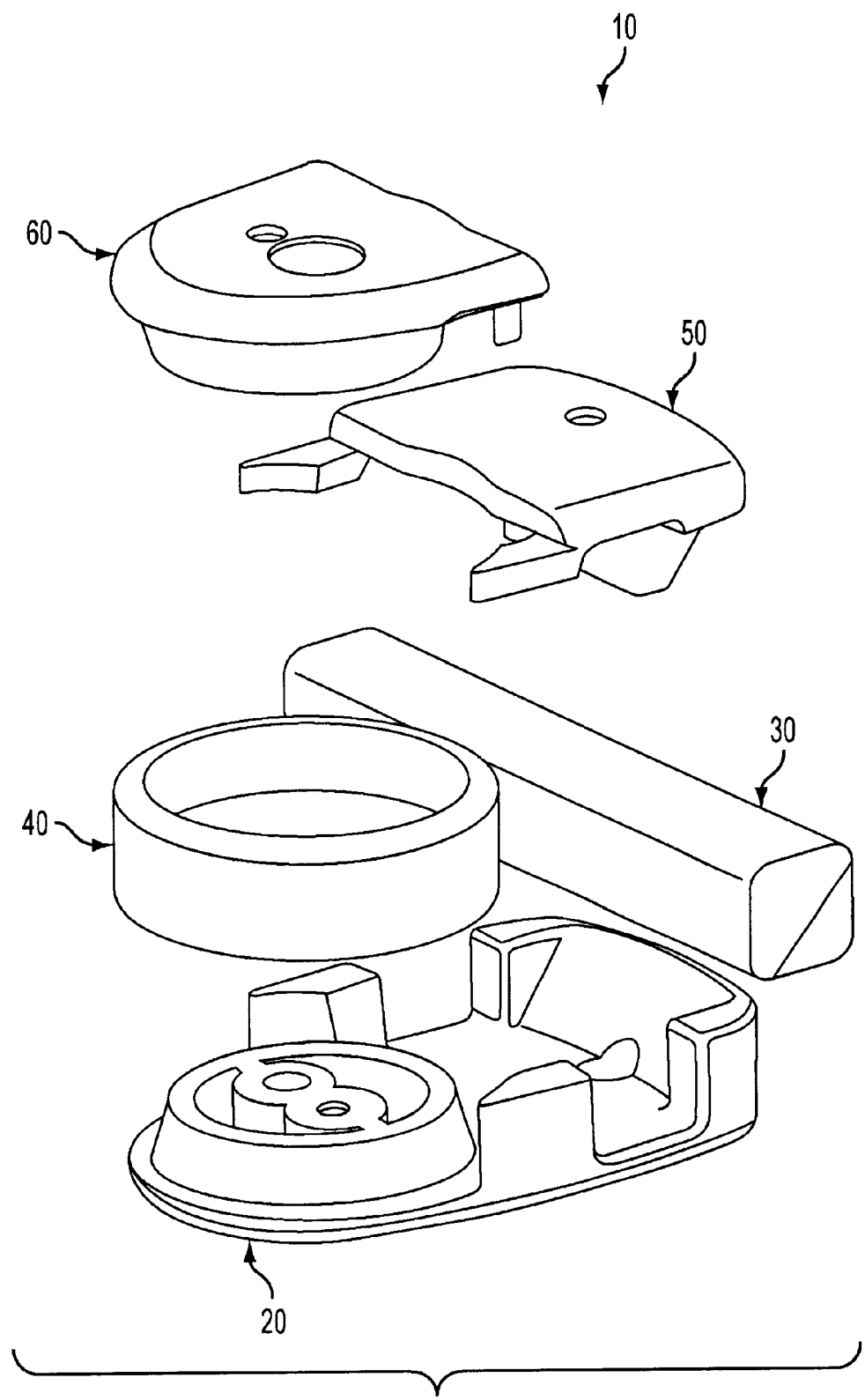
FIG. 1 shows an exploded view of the components of the rotation and translation bracket.

Reference will now be made in detail to the preferred embodiment of the present invention, examples of which are illustrated in the drawings.

FIG. 1 shows an exploded view of rotation and translation bracket assembly 10. The bracket assembly 10 includes the following components; a base member 20, a tube 30, a ring 40, a translation lock 50, and a rotation lock 60. Each of the components will now be explained in detail.

Figure 2:
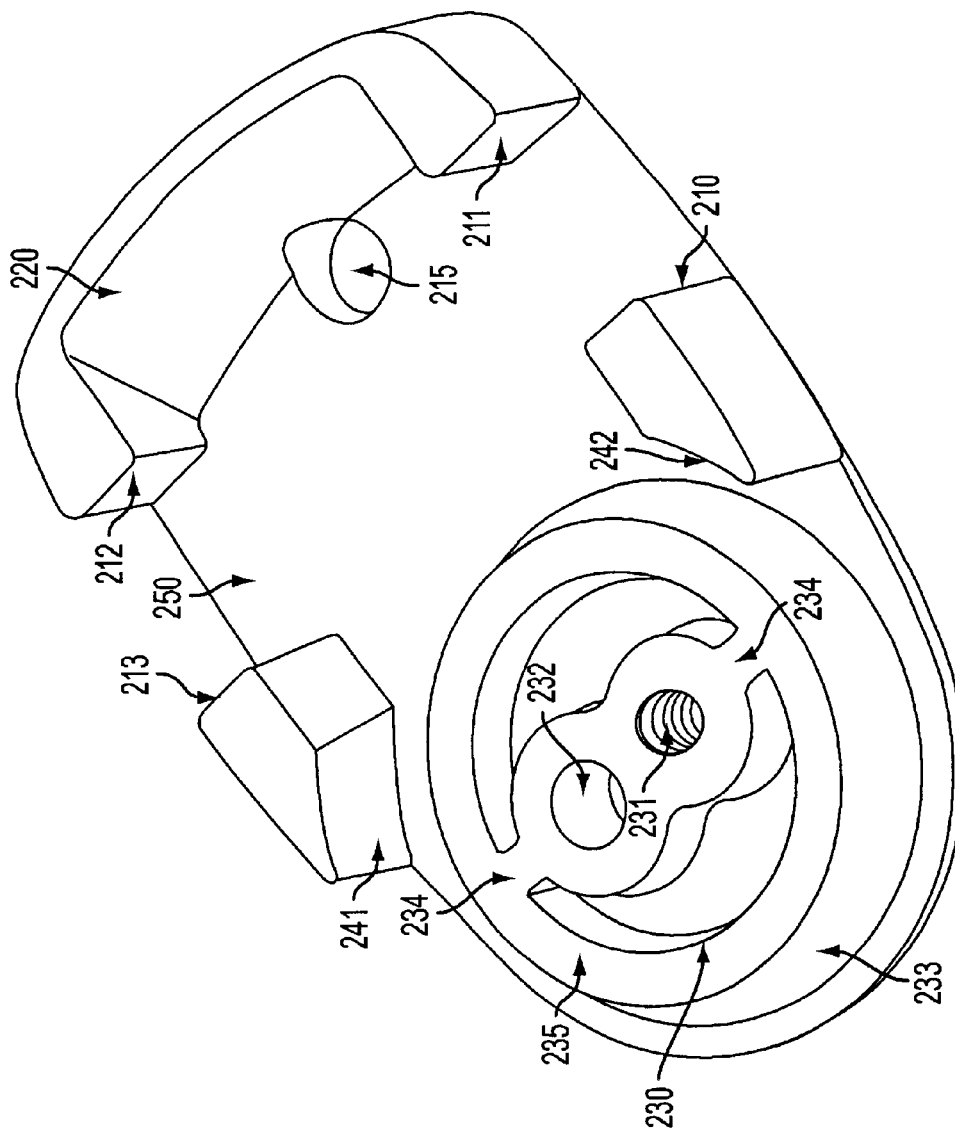
FIG. 2 show a perspective view of a base member of the present invention.
Figure 7:
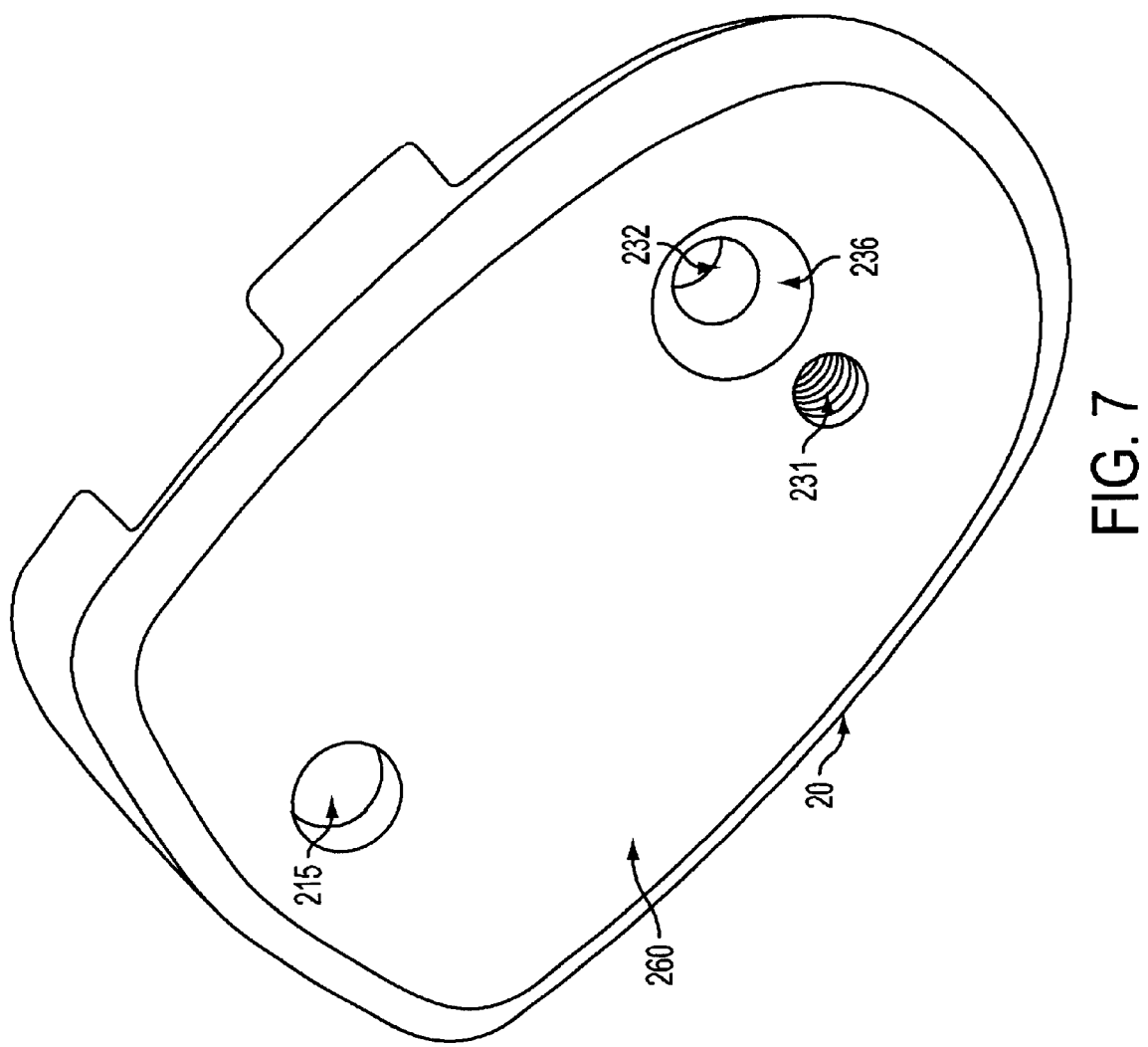
FIG. 7 shows a perspective view of the base member from the bottom.

FIGS. 2 and 7 show perspective views of a preferred base member 20. The base member 20 includes a top surface 250 and a bottom surface 260. The top surface 250 includes four tube restraining faces 210–213 (210 and 213 hidden), a threaded screw hole 231, a countersunk screw hole 232 with countersink 236, a translation lock inclined surface 220, two ring clearance faces 241 and 242 (hidden), a ring inner diameter surface 230, a ring inclined outer diameter surface 233, a screw clearance hole 215, two reinforcement ribs 234, and a ring top surface 235. The base member 20 may be constructed from a variety of materials including, but not limited to, plastic, metals, or like materials with similar desired properties. Preferably, the base member 20 is constructed of aluminum.

Figure 3:
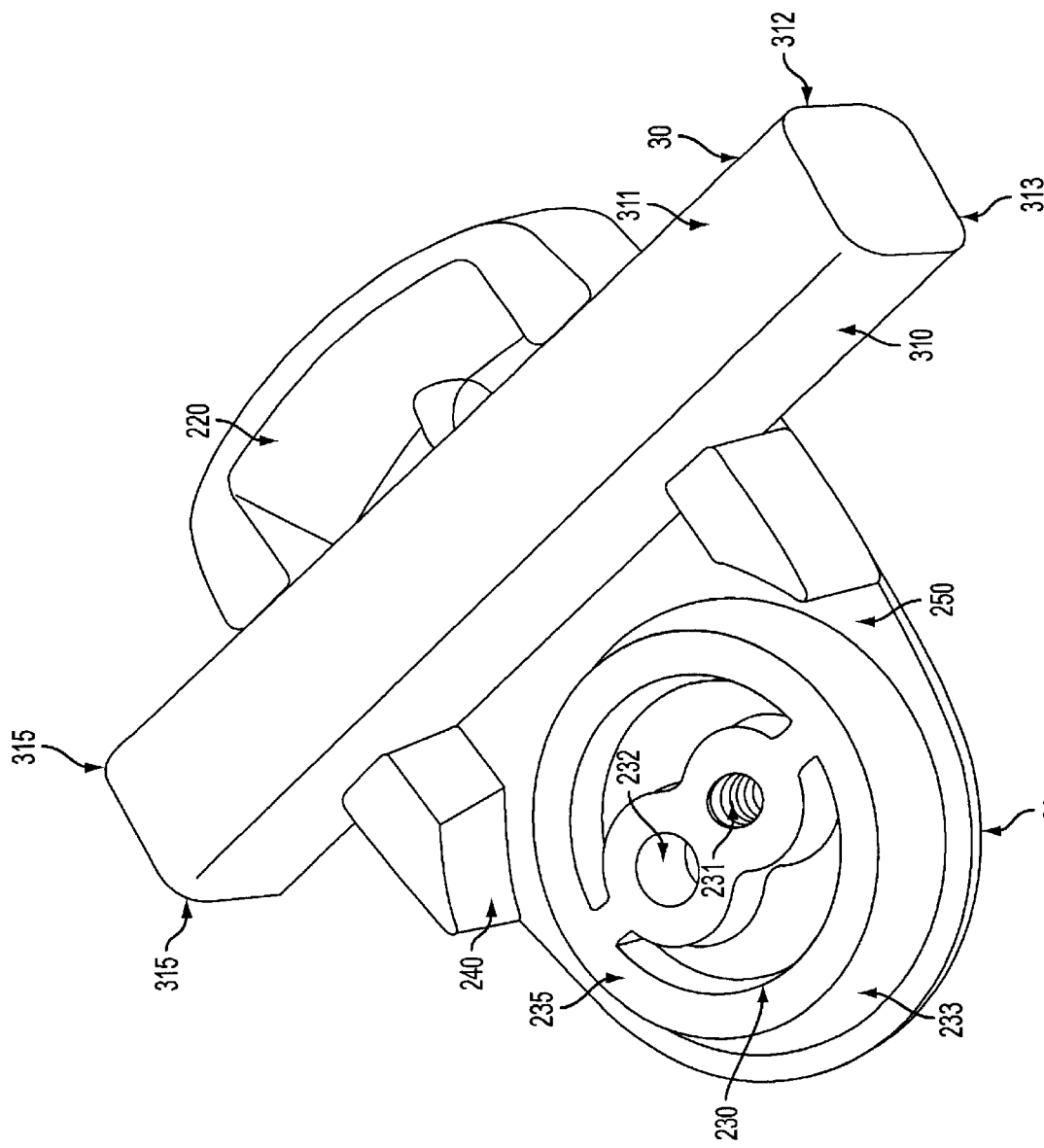
FIG. 3 shows a perspective assembly view of the base member and a tube.

FIG. 3 shows a perspective view of a preferred tube 30. The tube 30 is an elongated member with flat surfaces 310–313 (312 and 313 hidden) and edges 315. The tube 30 may be constructed from a variety of materials including, but not limited to, plastic, metals, or like materials with similar desired properties. Preferably, the tube 30 is constructed of steel.

Figure 8:
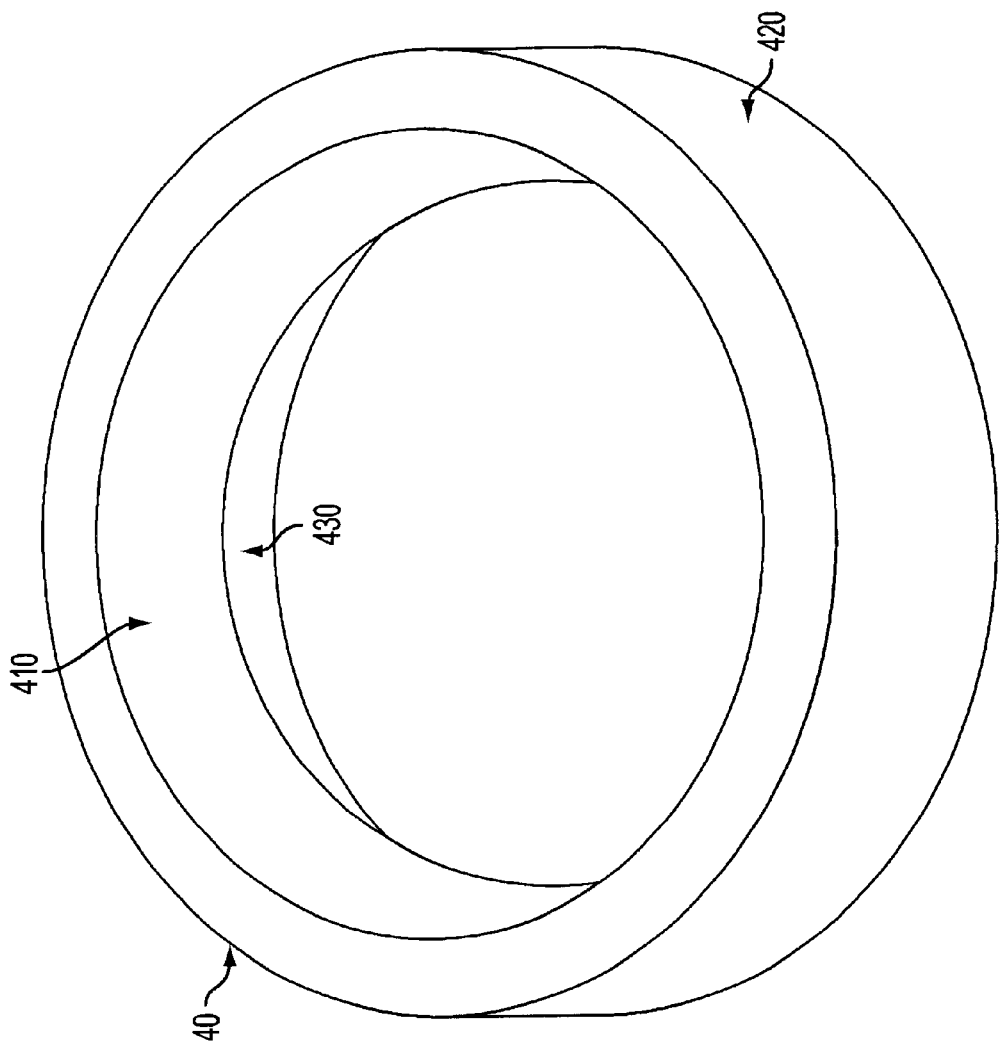
FIG. 8 shows a perspective view of the ring from the top.
Figure 9:
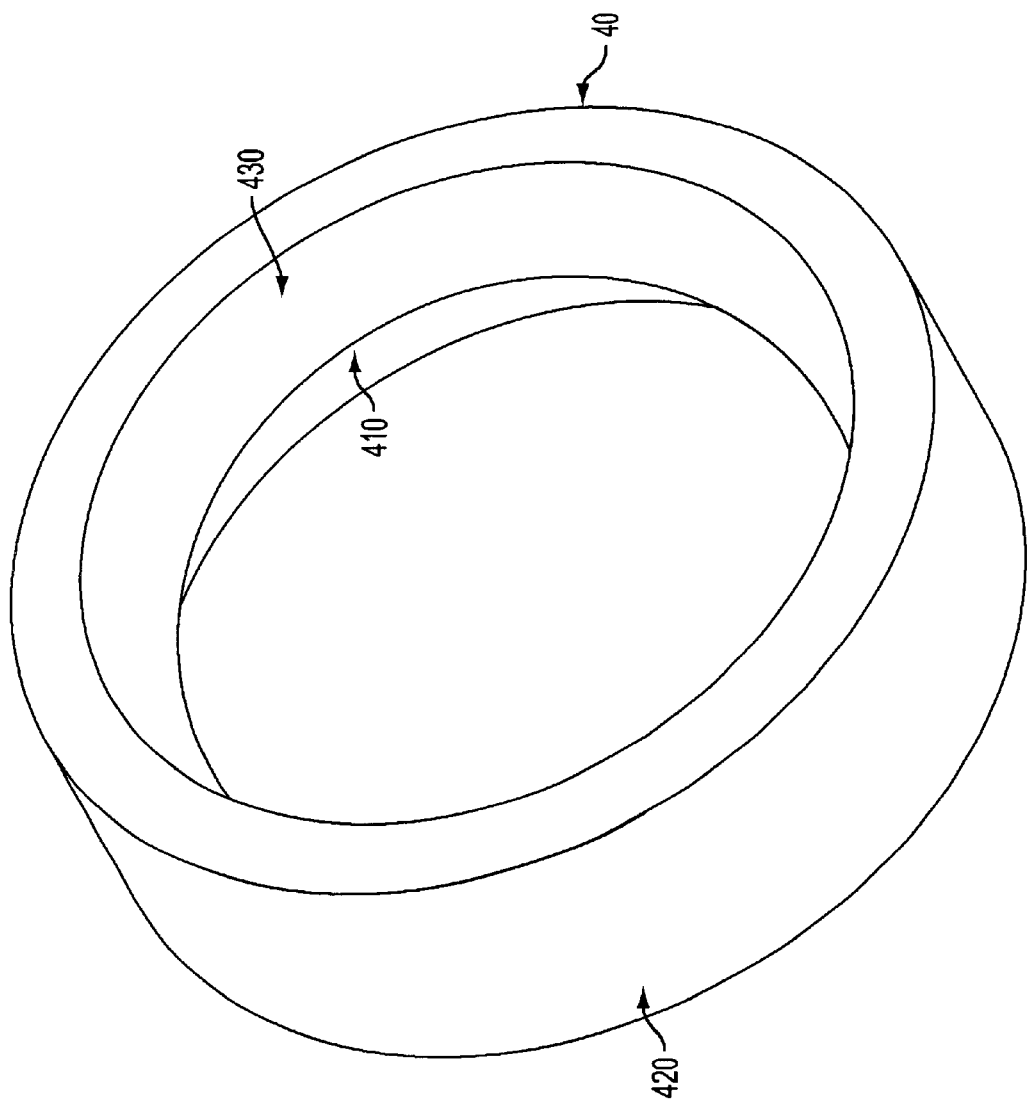
FIG. 9 shows a perspective view of the ring from the bottom.

FIGS. 8 and 9 show perspective views of a preferred ring 40. The ring 40 includes an outer flat surface 420 and two interior angled surfaces 410 and 430. Preferably, the ring 40 includes a protrusion (not shown) in the form of an attached substantially cylindrical or rectangular tube. The ring 40 may be constructed from a variety of materials including, but not limited to, plastic, metals, or like materials with similar desired properties. Preferably, the ring 40 is constructed of steel.

Figure 13:
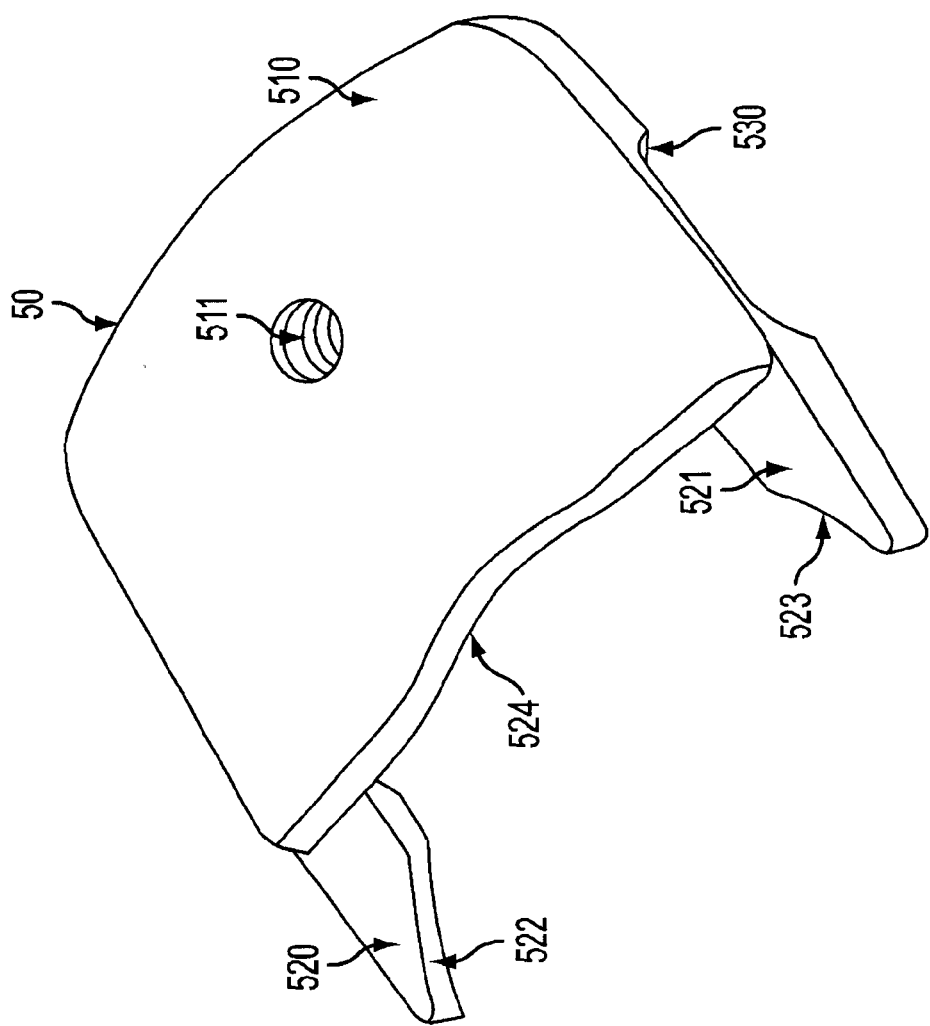
FIG. 13 shows a perspective view of the translation lock member.
Figure 14:
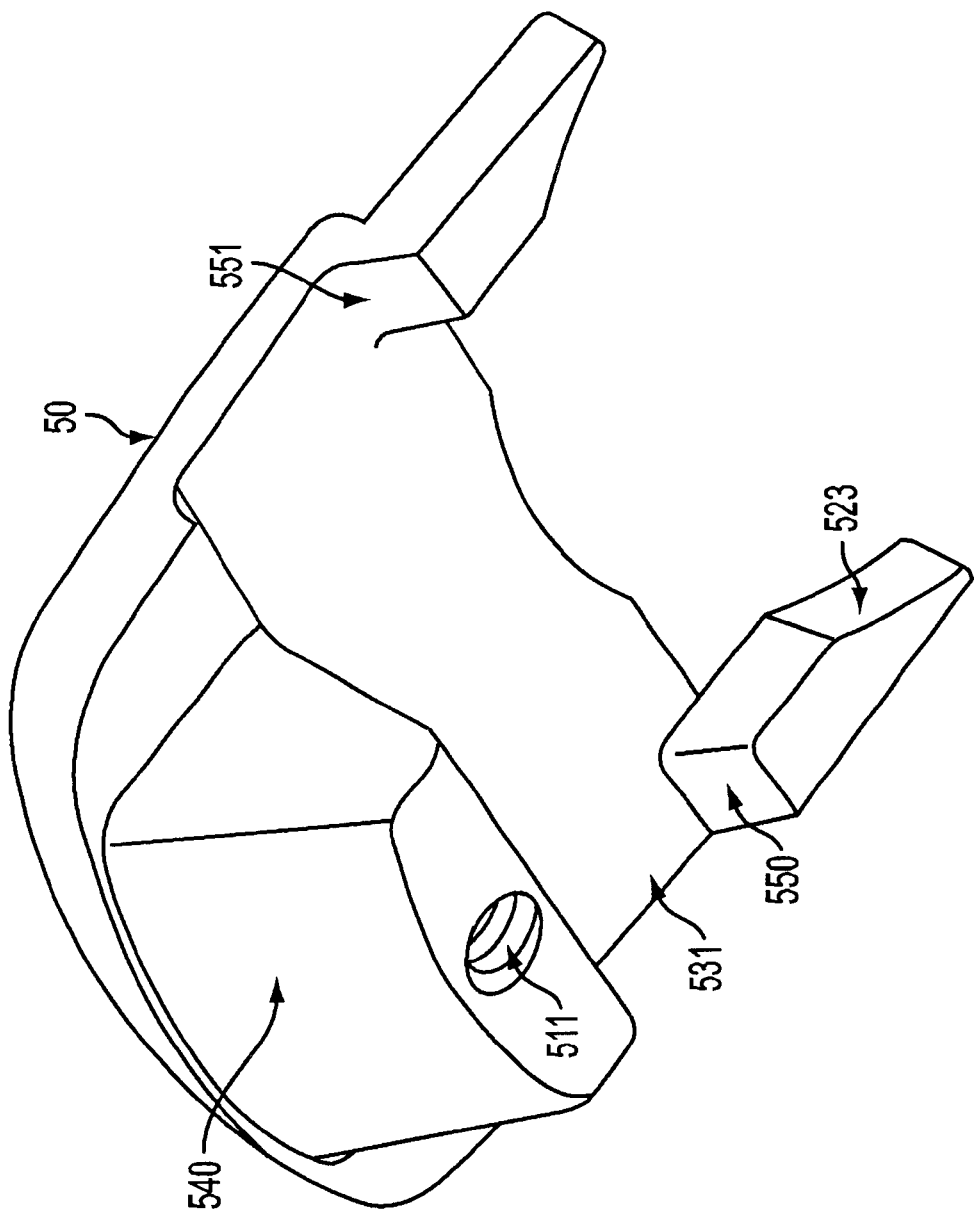
FIG. 14 shows a perspective view of the translation lock member from the bottom.
Figure 15:
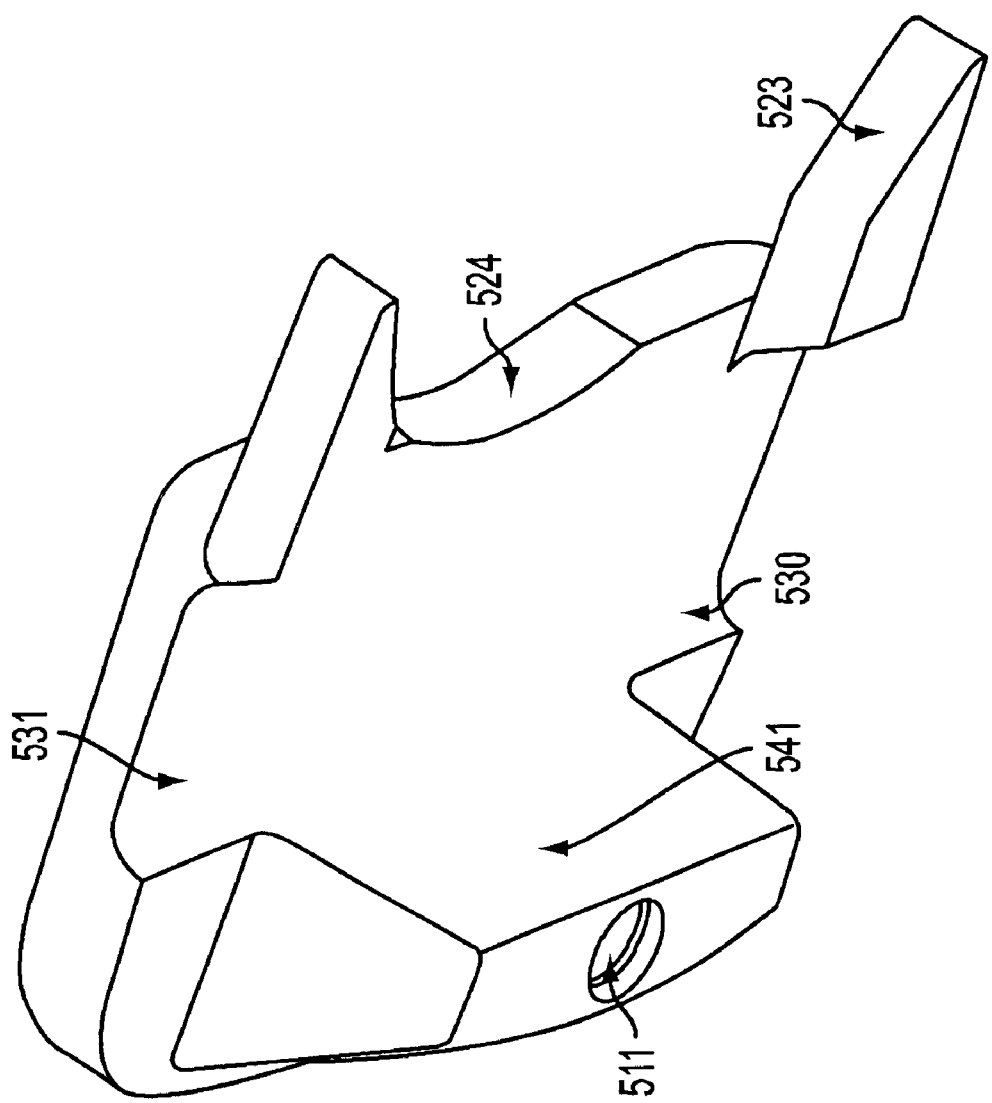
FIG. 15 shows another perspective view of the translation lock member from the bottom.

FIGS. 13–15 show perspective views of a preferred translation lock 50. The translation lock 50 includes a top surface 510, a threaded screw hole 511, a radial tube mating surface 530 and two flat tube mating surfaces 531 and 541, two tube clearance surfaces 550 and 551, two ring clearance surfaces 522 and 523, two tongues 520 and 521, an angled surface 540 and a recess 524. The translation lock further includes a securing face 541 to secure the tube 30. The translation lock 50 may be constructed from a variety of materials including, but not limited to, plastic, metals, or like materials with similar desired properties. Preferably, the translation lock 50 is constructed of aluminum.

Figure 10:
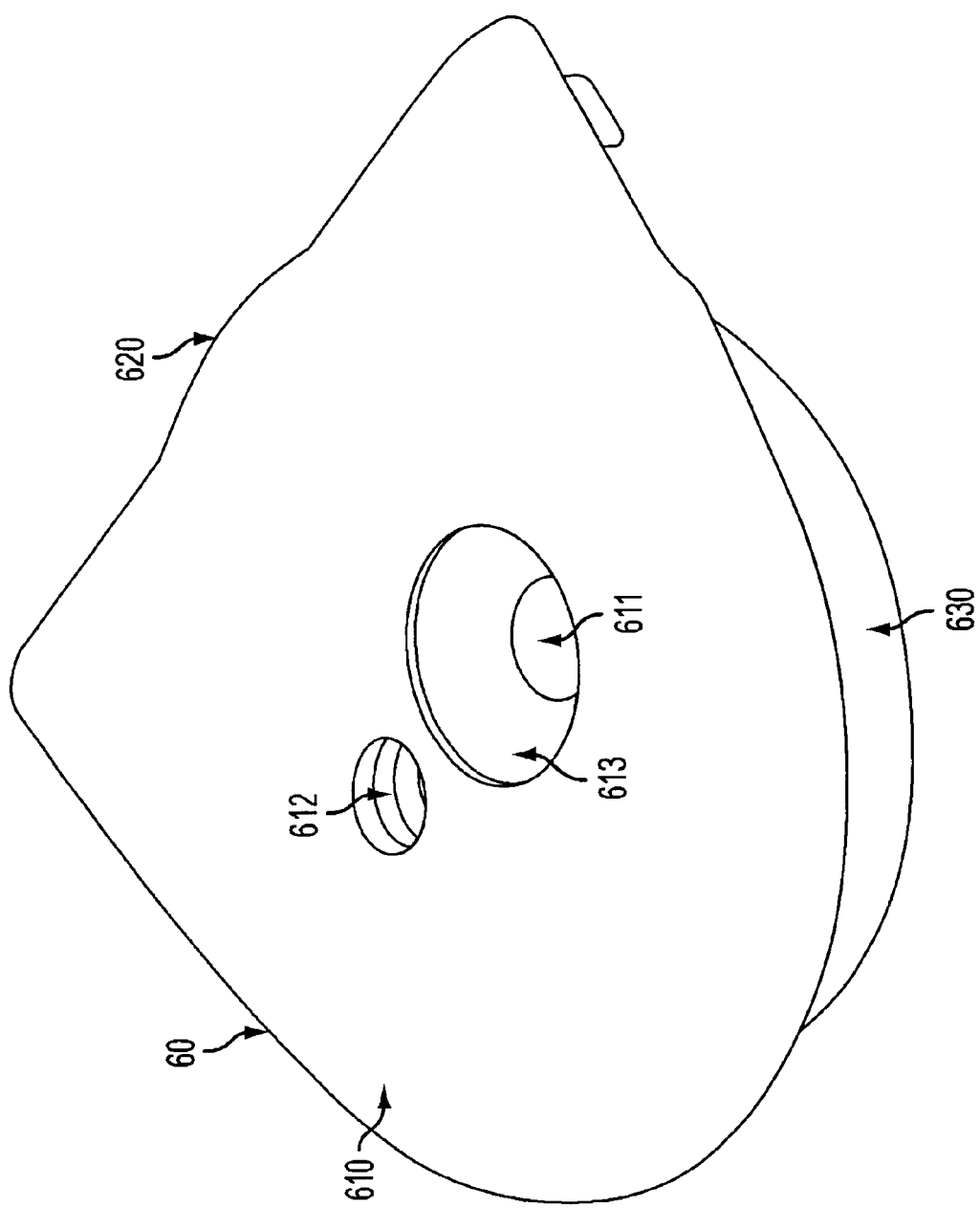
FIG. 10 shows a perspective view of the rotation lock member.
Figure 11:
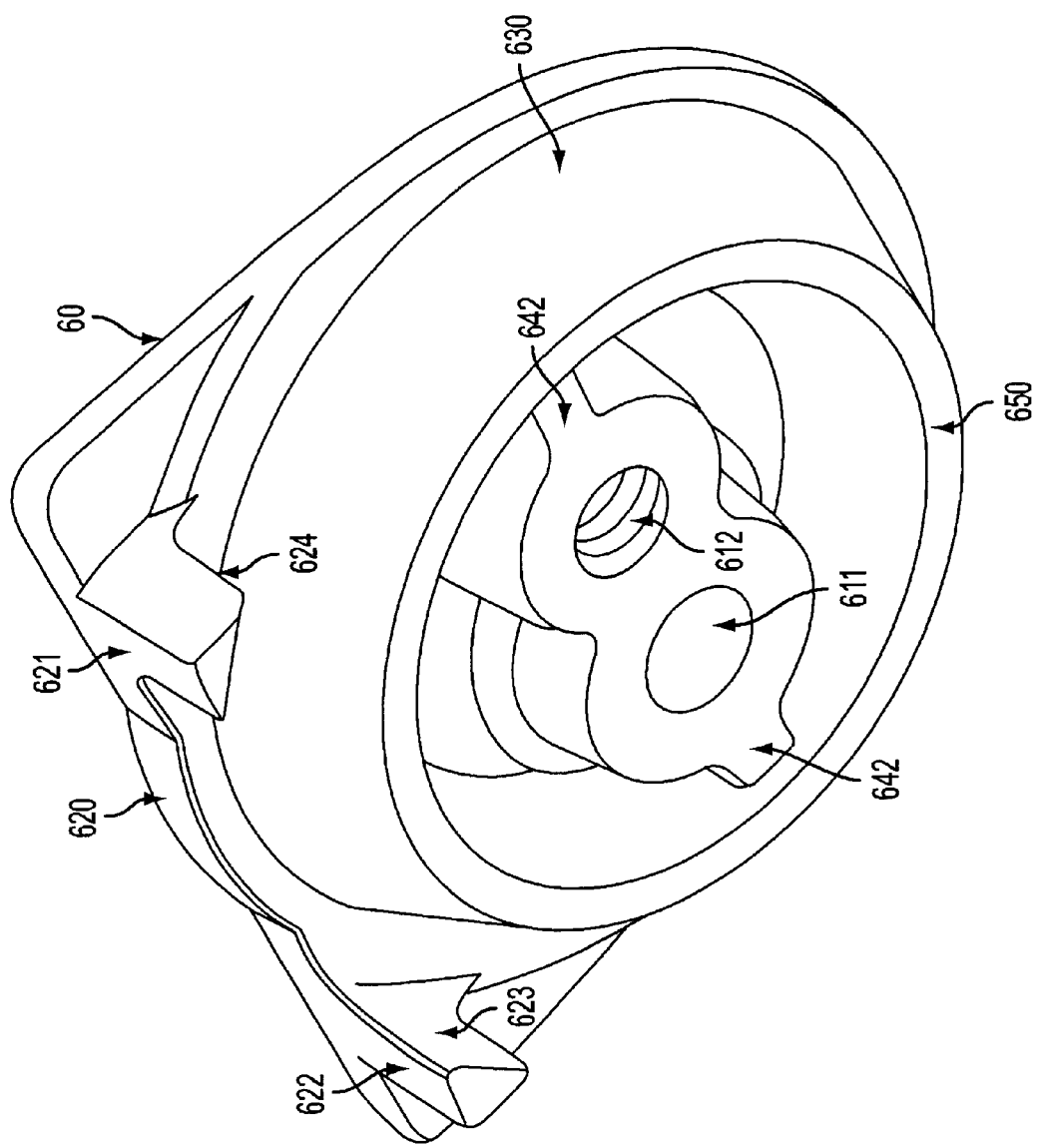
FIG. 11 shows a perspective view of the rotation lock member from the bottom.
Figure 12:
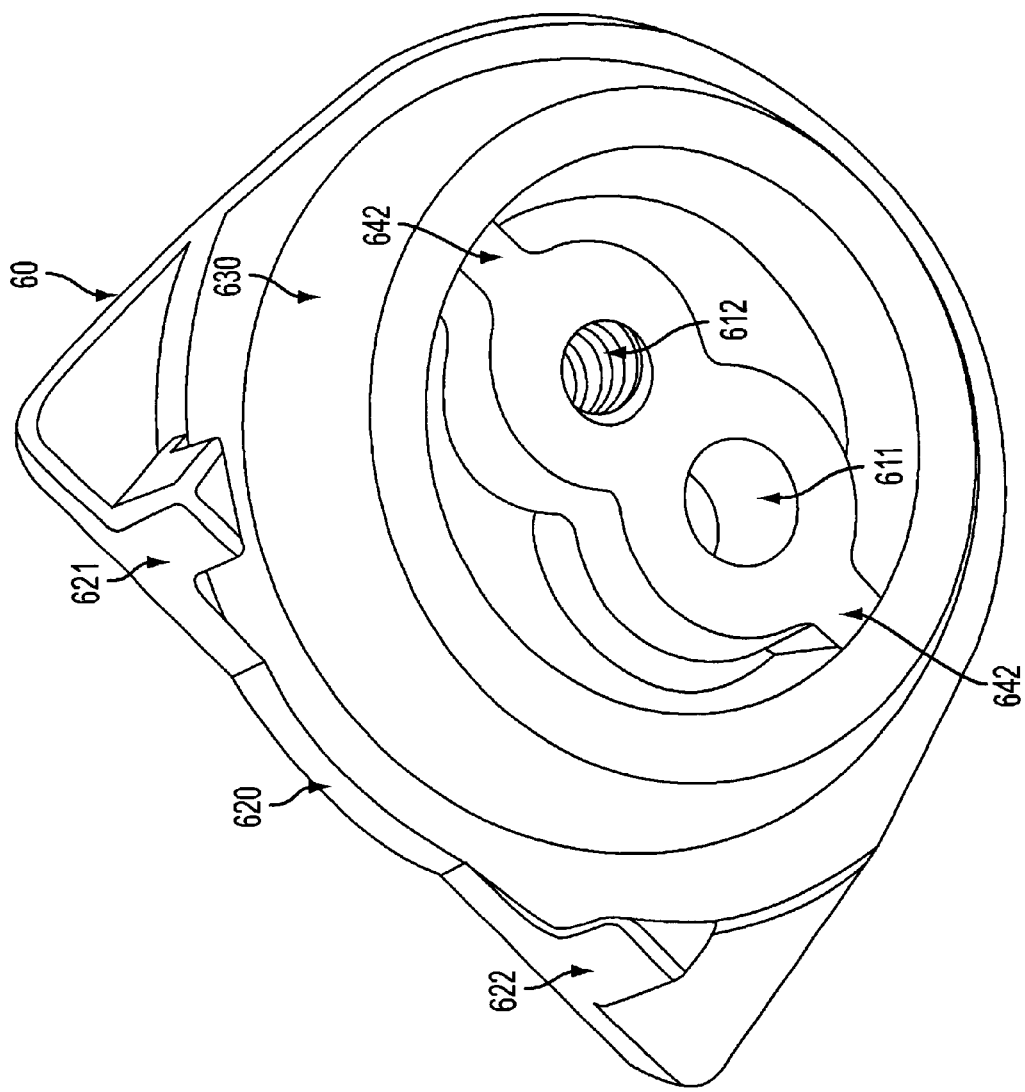
FIG. 12 shows another perspective view of the rotation lock member from the bottom.

FIGS. 10–12 show perspective views of the rotation lock 60. The rotation lock 60 includes a top surface 610, a threaded screw hole 612, a countersunk screw hole 611 with countersink 613, a protrusion 620, torque control stop surfaces 621 and 622, two reinforcement ribs 642, and angled ring mating surface 630, a ring protrusion 650, and two ring clearance surfaces 623 and 624. The rotation lock 60 may be constructed from a variety of materials including, but not limited to, plastic, metals, or like materials with similar desired properties. Preferably, the rotation lock 60 is constructed of aluminum.

The construction and operation of the rotation and translation bracket assembly will now be described in detail.

Referring to FIGS. 1–15, for assembly and operation, the tube 30 is inserted into base member 20 as shown in FIG. 3. The tube 30 may be disposed within the base member 20 before or after the translation lock 50 is disposed on the base member 20. The flat surface 310 of tube 30 bear against surfaces 210 and 213 of the base member 20. The flat surface 313 (hidden) of tube member 30 bears against top surface 250 of base member 20.

Figure 4:
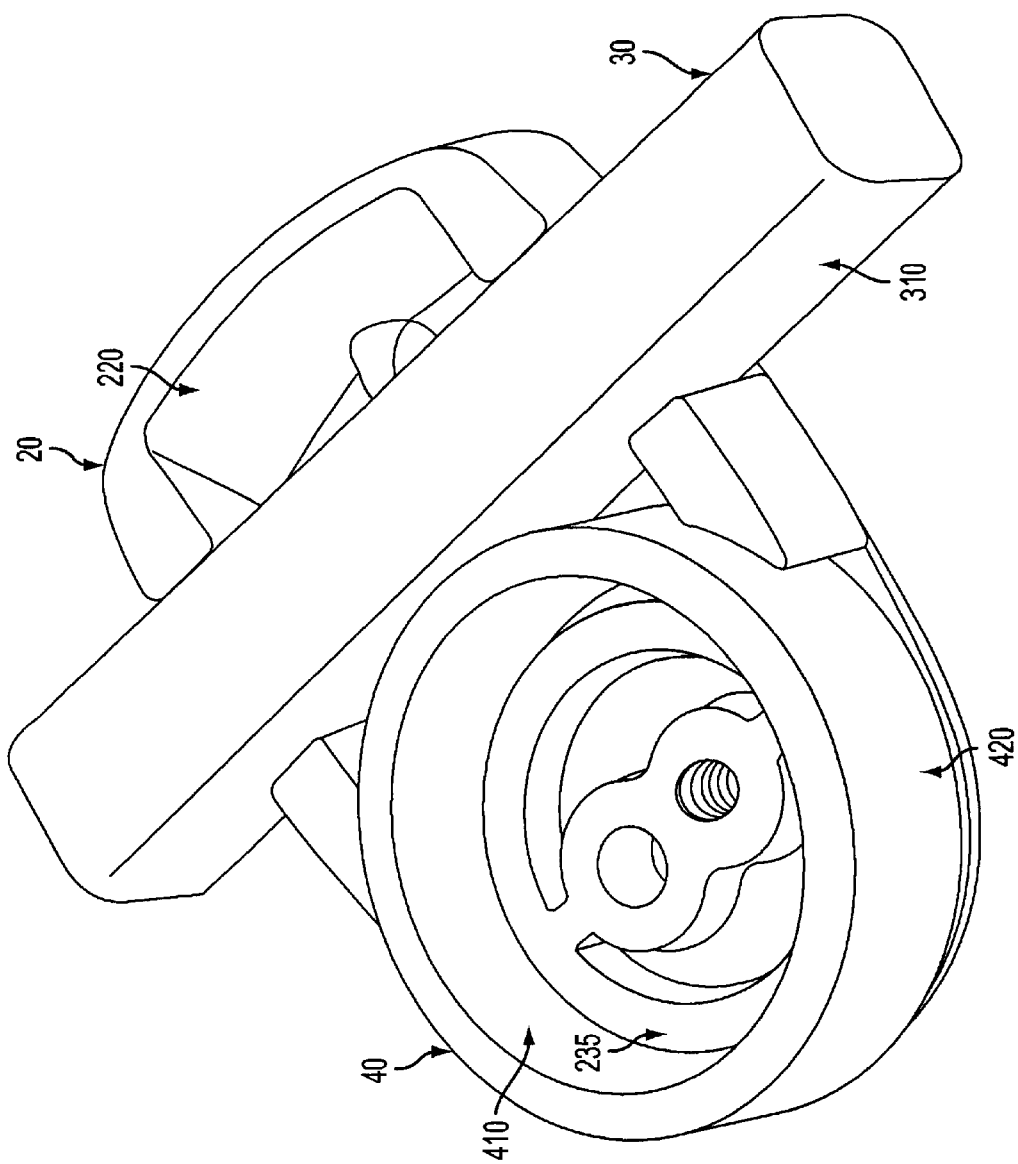
FIG. 4 shows a perspective assembly view of the base member, the tube and a ring.
Figure 4A:
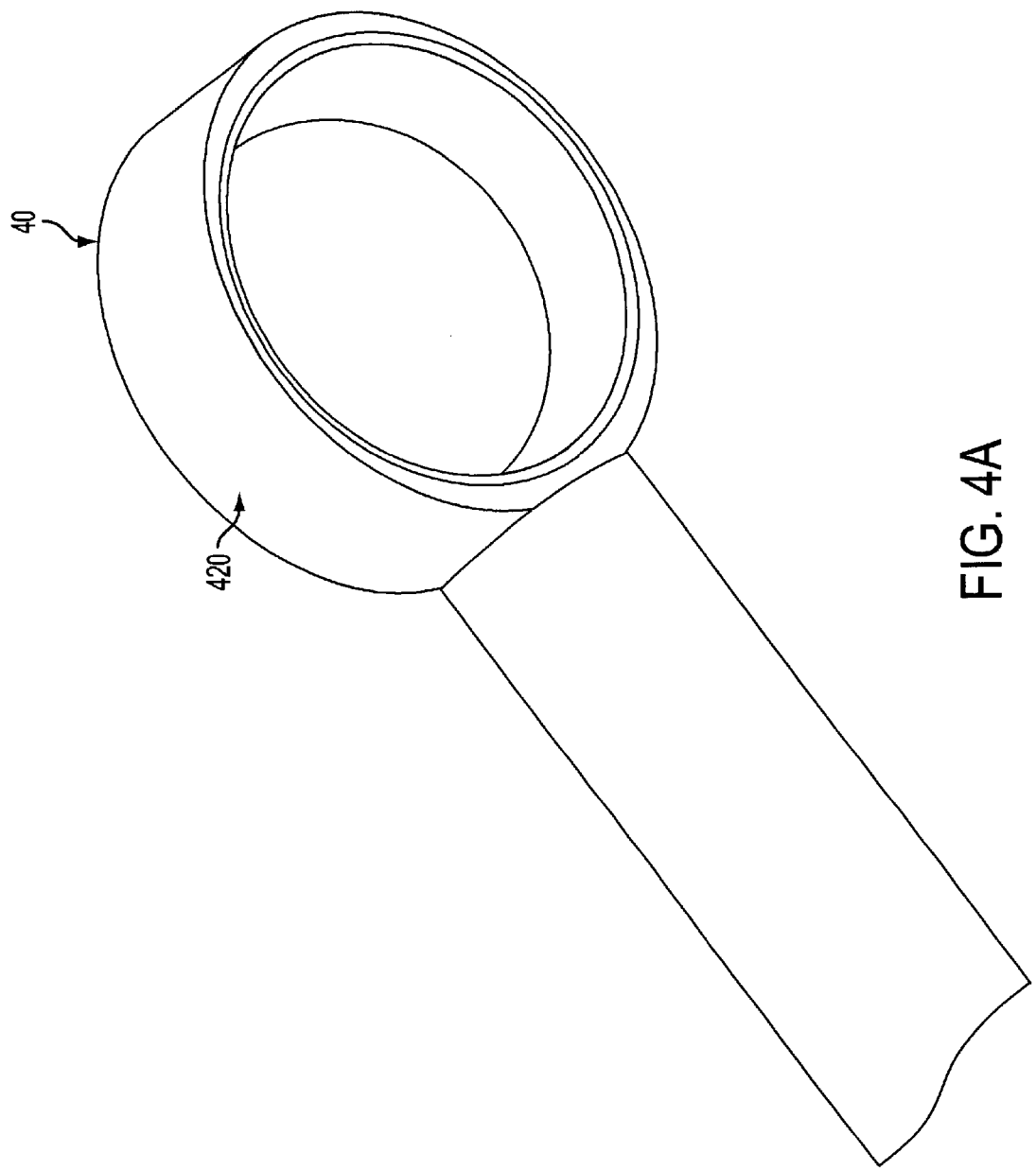
FIG. 4A shows a perspective view of the ring with a protrusion.
Figure 5:
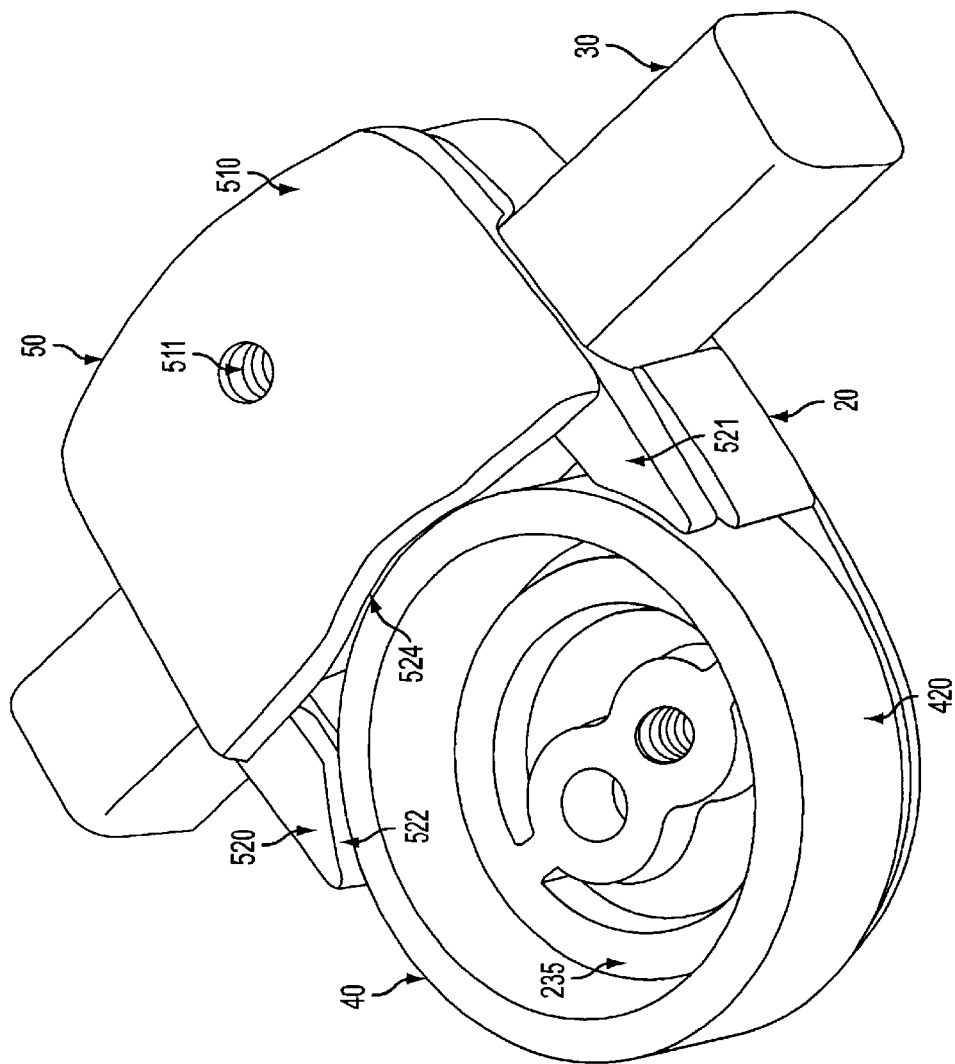
FIG. 5 shows a perspective assembly view of the base member, the tube, the ring and a translation lock member.

As shown in FIG. 4A, the ring 40 may include a protrusion. Preferably, the protrusion is provided in the form of an attached tube. The attached tube may have a variety of cross sections, including circular, triangular, rectangular, polyhedral, or the like. The attached tube may be attached to a variety of locations on the ring 40 by a variety of methods. Preferably, the attached tube has a substantially rectangular cross section and is welded to the outer flat surface 420 of the ring 40. It can be seen that angled surface 430 of ring 40 mates against the ring inclined outer diameter surface 233 on base member 20. Reinforcement ribs 234 and 235 provide reinforcement for the cavity created by ring inner diameter surface 230. As shown in FIG. 5, translation lock 50 is next placed on base member 20. The angled surface 540 of translation lock 50 mates against translation lock inclined surface 220 of base member 20. The tube mating surfaces 530, 531, and 541 of translation lock 50 mate against the edge 315 and the flat surface 310 of tube 30. The clearance surfaces 522 and 523 of translation lock 50 form a gap with outer flat surface 420 of ring 40.

Figure 6:
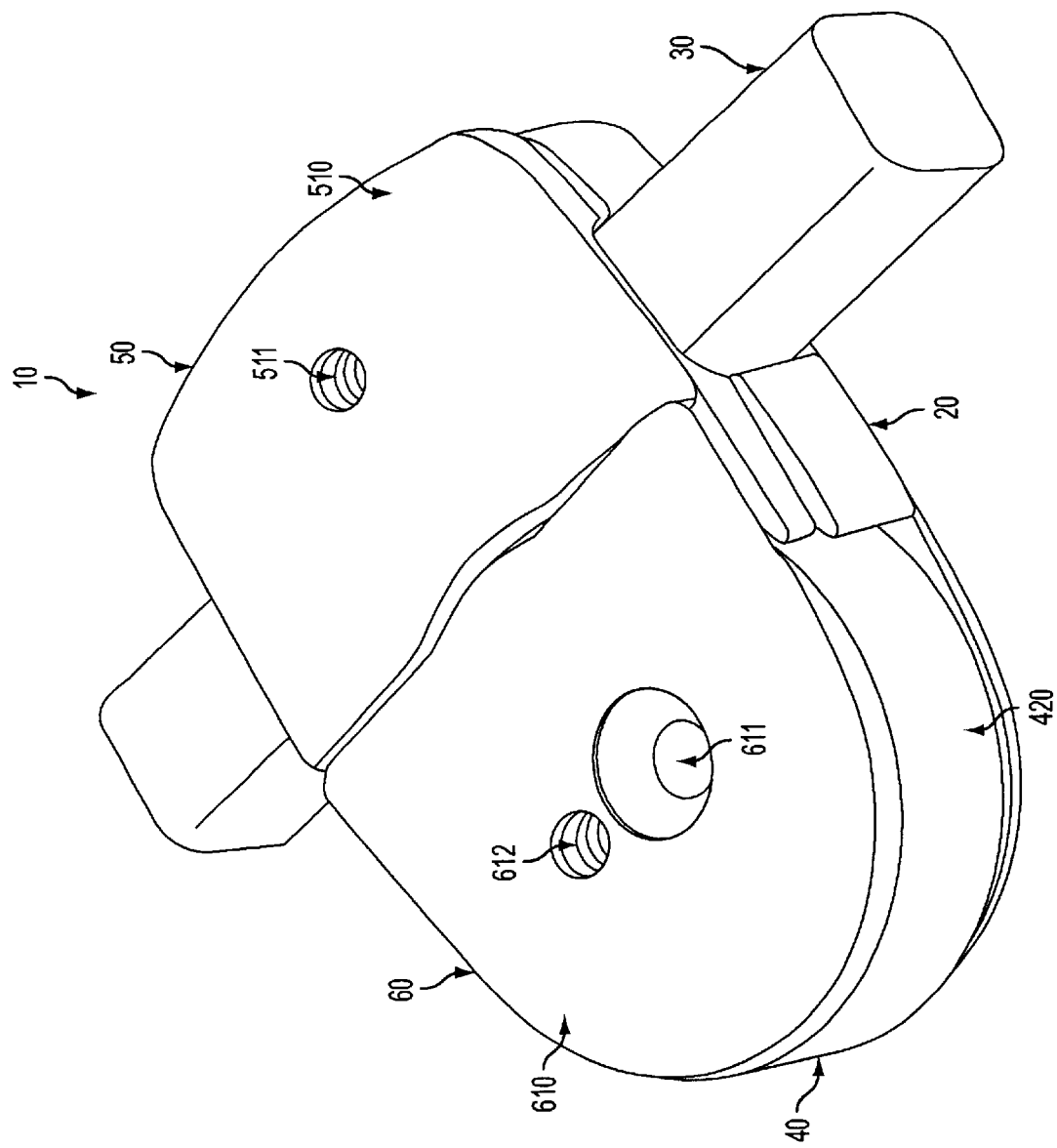
FIG. 6 shows a perspective assembly view of the base member, the tube, the ring, the translation lock and a rotation lock member.

As shown in FIG. 6, rotation lock 60 is placed on base member 20. It can be seen that angled ring mating surface 630 of rotation lock 60 mates against interior angled surface 410 of ring 40. Torque control stop surfaces 621 and 622 of rotation lock 60 form a gap with flat surface 312 of tube 30. Ring clearance surfaces 623 and 624 of rotation lock 60 form a gap with outer flat surface 420 of ring 40. Reinforcement ribs 642 of rotation lock 60 provide reinforcement for the cavity created by ring protrusion 650. Protrusion 620 of rotation lock 60 rests in recess 524 of translation lock 50. To complete the assembly, a screw (not shown) is inserted through screw hole 232 of base member 20 into threaded screw hole 612 of rotation lock 60. Similarly, a screw (not shown) is inserted through screw hole 611 of rotation lock 60 into threaded screw hole 231 of base member 20. Tightening of these screws draws the rotation lock 60 towards the base member 20. By this arrangement, the ring 40 is secured within the bracket assembly 10. For locking the tube 30 in place, a screw (not shown) is inserted through screw clearance hole 215 of base member 20 into threaded screw hole 511 of translation lock 50. By this arrangement, the tube 30 is secured within the bracket assembly 10.

In operation, in order to provide translation control, first a tube 30 is inserted into the cavity between base member 20 and translation lock member 50 as shown in FIG. 6. With the completed assembly shown in FIG. 6, the bracket assembly 10 can be translated relative to the longitudinal axis of the tube 30, and vise-versa. In order to secure the position of the bracket assembly 10 at a given axial location on the tube 30, a screw (not shown), inserted in threaded screw hole 511 of translation lock 50 through screw clearance hole 215 of base member 20, and can be tightened as necessary. Tightening the screw (not shown) creates a force between angled surfaces 540 of translation lock 50, and translation lock inclined surface 220 of base member 20, respectively. Tightening this screw draws the translation locking member 50 toward the base member 20. Consequently, the securing face 541 and tube mating surfaces 530 and 531 contact the flat surface 312 and the edge 315 of the tube 30, moving the tube 30 to a position where the tube restraining faces 210 and 213 contact flat surface 310 of the tube 30, a top surface of the translation lock 50 contacts flat surface 311 of the tube 30, top surface 250 contacts flat surface 313 of the tube 30.

In order to provide rotation control, an elongated shaft (not shown in FIG. 6, see FIG. 4A) can be attached to ring 40. As explained above, a screw (not shown) is inserted through screw hole 232 of base member 20 into threaded screw hole 612 of rotation lock 60. Similarly, a screw (not shown) is inserted through screw hole 611 of rotation lock 60 into threaded screw hole 231 of base member 20. When the screws are relatively loose, the base member 20 is free to rotate relative to ring 40 (and elongated shaft attached to ring 40), and allow pivotal movement of bracket assembly 10 relative to the elongated shaft (not shown in FIG. 6, see FIG. 4A). When the screws are tightened, a downward and outward wedging force is exerted on ring 40. The outward wedging force is provided by angled mating surface 630 of rotation lock 60 bearing against angled mating surface 410 of ring 40. Similarly, the downward wedging force is provided by ring inclined outer diameter surface 233 of base member 20 bearing against angled mating surface 430 of ring 40. This wedging force prevents rotation of base member 20 relative to ring 40, and thus prevent pivotal movement of bracket assembly 10 relative to the elongated shaft (not shown in FIG. 6, see FIG. 4A). By this arrangement, a screw force used to secure the ring 40 in the bracket assembly 10 better prevents slipping of the secured ring 40 over the brackets in the prior art, as the friction between the ring 40 and the interior angled mating surfaces 410 and 430.

While the invention has been illustrated in detail and with reference to a specific embodiment thereof, it will be apparent to one skilled in the art that various changes and modifications can be made therein without departing from the spirit and scope thereof Thus, it is intended that the present invention cover the modifications and variations of this invention as would be apparent to those skilled in the art.

What is claimed is:

1. A bracket assembly comprising:
   (a) a base member having a translation lock inclined surface;
   (b) a locking structure capable of stationary attachment to said base member including a translation lock having a translation lock inclined surface, said base member inclined surface slidably mounted with said translation lock inclined surface of said locking structure to form a translation sliding face there-between;
   (c) a first releasable holding mechanism and a second releasable holding mechanism, each connecting said base member with said locking structure and capable of adjustment between loosened and tightened conditions;
   (d) a rotational member disposable in a fitted relationship with said base member and locking structure capable of pivotal movement relative to said base member and locking structure when said first releasable holding mechanism is adjusted to said loosened condition, and remains fixed with relation to said base member and locking structure when said first releasable holding mechanism is adjusted to said tightened condition; and
   (e) a longitudinal member disposable in a fitted relationship with said base member and locking structure capable of linear movement relative to said base member and locking structure when said second releasable holding mechanism is adjusted to said loosened condition, and remains fixed with relation to said base member and locking structure when said second releasable holding mechanism is adjusted to said tightened condition, said second releasable holding mechanism provides a relative displacement of said base member inclined surface and said translation lock inclined surface of said locking structure along said translation sliding face when adjusted between said loosened and said tightened conditions.

2. The bracket assembly of claim 1, wherein the locking structure comprises a rotation lock and said translation lock.

3. The bracket assembly of claim 1, wherein the longitudinal member is a tube.

4. The bracket assembly of claim 3, wherein the tube includes four flat surfaces and four edges.

5. The bracket assembly of claim 1, wherein the rotational member comprises a ring having an outer flat surface, a first angled interior surface and second angled interior surface, said first and second interior surfaces are aligned axially and create a wedge-shaped radial cross section of said ring.

6. The bracket assembly of claim 5, wherein the rotational member further comprises a protrusion attached to said outer flat surface and extends radially from said ring.

7. The bracket assembly of claim 1, wherein:
   said base member comprises a top surface and a bottom surface, said top surface having a translation restraining surface, said translation lock inclined surface of said base member, a translation member recess, a rotation restraining surface, and a rotation member recess;
   said locking structure further includes a rotation lock;
   said translation lock having a top surface and a bottom surface;
   said translation lock bottom surface having a translation restraining surface, said translation lock inclined surface of said locking structure, and a translation member recess;
   said rotation lock having a top surface and a bottom surface; and
   said rotation lock bottom surface having a rotation restraining surface.

8. The bracket assembly of claim 7, wherein:
   said rotational member comprises a ring having an outer flat surface, a first angled interior surface and second angled interior surface, said first and second interior surfaces are aligned axially and create a wedge-shaped radial cross section;
   said rotation lock restraining surface is inclined to match the angle of said first interior ring surface;
   said base member rotation restraining surface is inclined to match the angle of said second interior ring surface;
   said rotational member interior surfaces slidably mounted between said rotation lock restraining surface and said base member rotation restraining surface to form first and second rotation sliding faces there between; and
   said first releasable holding mechanism provides a relative displacement of said base member rotation restraining surface and said rotation lock restraining surface with said rotational member interior surfaces along said first and second rotation sliding faces.

9. The bracket assembly of claim 8, wherein:
   said rotation lock restraining surface and said base member rotation restraining surface bind against said rotational member interior surfaces when said locking structure is adjusted to said tightened condition.

10. The bracket assembly of claim 7, wherein:
    said longitudinal member is a tube having four flat surfaces and four edges; and
    said locking structure binds said base member translation restraining surface and said translation lock translation restraining surface against opposing tube surfaces, and said base member translation member recess and said translation lock translation member recess with opposing tube surfaces.

11. The bracket assembly of claim 7, wherein said first releasable holding mechanism comprises:
    (a) a threaded screw hole, and a countersunk screw hole with countersink on said base bottom surface;
    (b) a threaded screw hole on said rotation lock which is axially aligned with said base member countersunk screw hole when said rotation lock is placed in its proper position relative to the base member, and a countersunk screw hole with countersink which is axially aligned with said base member threaded screw hole when said rotation lock is placed in its proper position relative to the base member; and
    (c) screws for each said threaded screw hole.

12. The bracket assembly of claim 7, wherein said second releasable holding mechanism comprises:
    (a) a screw clearance hole on said base bottom surface;
    (b) a threaded screw hole on said translation lock that axially aligns with said screw clearance hole on said base member; and
    (c) screws for said threaded screw hole.

13. A bracket assembly comprising:
    (a) a base member;
    (b) a locking structure capable of stationary attachment to said base member;
    (c) a first releasable holding mechanism and a second releasable holding mechanism, each connecting said base member with said locking structure and capable of adjustment between loosened and tightened conditions;
    (d) a rotational member disposable in a fitted relationship with said base member and locking structure capable of pivotal movement relative to said base member and locking structure when said first releasable holding mechanism is adjusted to said loosened condition, and remains fixed with relation to said base member and locking structure when said first releasable holding mechanism is adjusted to said tightened condition, said rotational member comprising a ring to engage said base member, said ring having a first angled interior surface and a second interior surface, said first and second interior surfaces are aligned axially and create a wedge-shaped radial cross section of said rotational member; and (e) a longitudinal member disposable in a fitted relationship with said base member and locking structure capable of linear movement relative to said base member and locking structure when said second releasable holding mechanism is adjusted to said loosened condition, and remains fixed with relation to said base member and locking structure when said second releasable holding mechanism is adjusted to said tightened condition.

* * * * *